G. D. MAY.
APPLICATOR FOR LIVE STOCK.
APPLICATION FILED DEC. 17, 1917.
1,269,725.
Patented June 18, 1918.
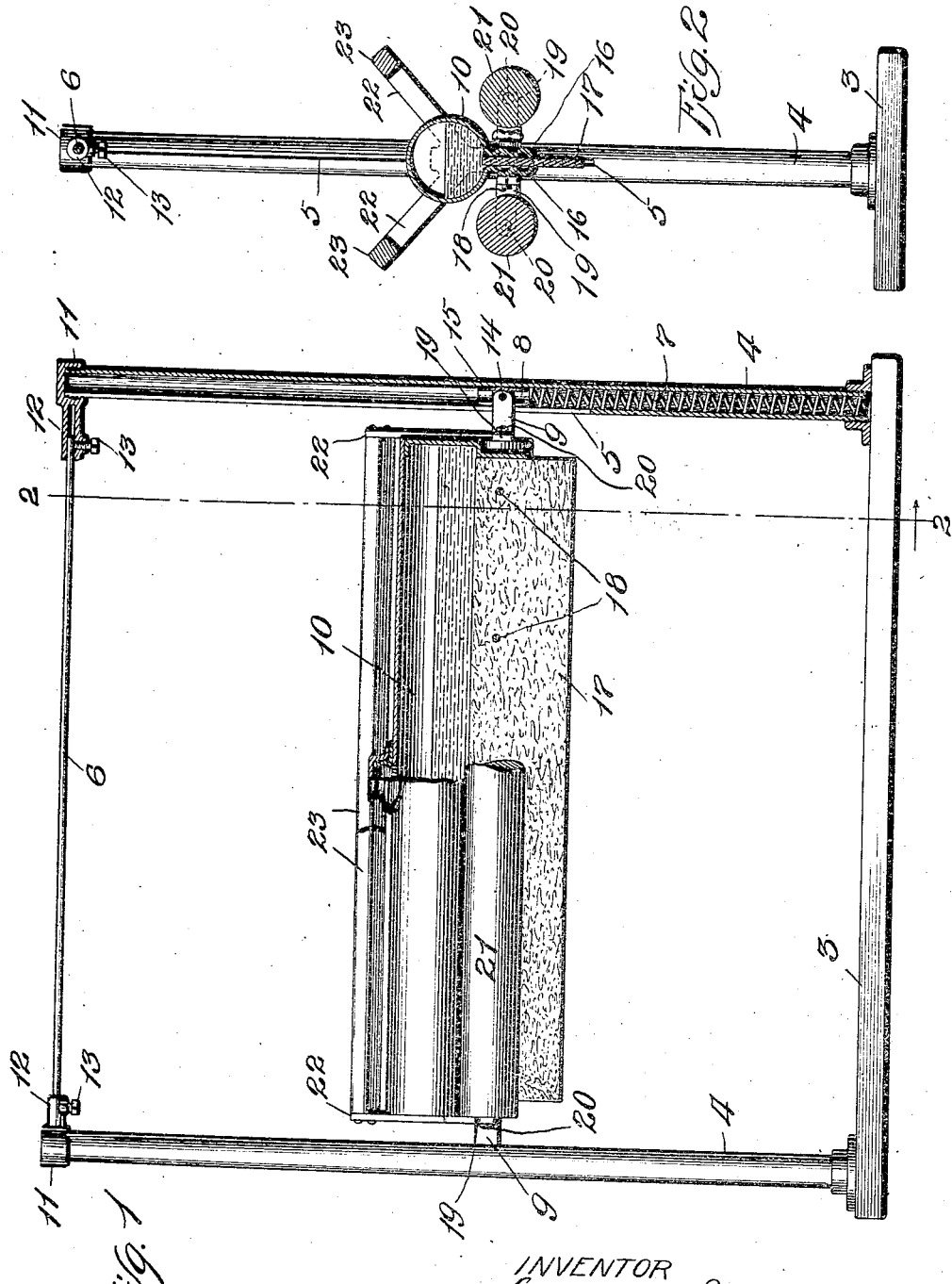
INVENTOR
George D. May.
by Ralph Raush ATTY.

UNITED STATES PATENT OFFICE.

GEORGE D. MAY, OF ST. LOUIS, MISSOURI.

APPLICATOR FOR LIVE STOCK.

1,269,725.  Specification of Letters Patent.  Patented June 18, 1918.

Application filed December 17, 1917. Serial No. 207,500.

*To all whom it may concern:*

Be it known that I, GEORGE D. MAY, a citizen of the United States, residing at the city of St. Louis, State of Missouri, have invented a certain new and useful Improvement in Applicators for Live Stock, of which the following is a specification, reference being had to the accompanying drawing, forming a part thereof.

This invention relates to a certain new and useful improvement in applicators, or, as they are more commonly designated, oilers, for live-stock.

The chief objects of my present invention are to provide an applicator or oiler of the kind stated comprising a liquid containing tank having a capillary outlet which substantially is continuously in condition for service and which functionates automatically, without valves or other fluid-controlling means, to apply the liquid or medicament upon contact by an animal passing therebeneath; to provide an applicator of the kind stated having a movably mounted and preferably roller-protected liquid-containing tank adapted not only to readily yield on engagement therewith by the animals to accommodate animals of different heights, but to also apply the liquid or medicament upon animals of different heights passing side-by-side therebeneath; to provide a spring poise for the applicator proper which serves to assist an animal to elevate it in passing therebeneath; and to improve generally upon, and simplify the construction of, applicators of the class mentioned.

With the above and other objects in view, my present invention resides in certain novel features of form, construction, arrangement, and combination of parts, all as will hereinafter be described and afterward pointed out in the claims.

In the accompanying drawing,—

Figure 1 is an elevational view, partly in section, of an applicator embodying my invention; and Fig. 2 is a transverse sectional view through the same taken approximately on the line 2—2, Fig. 1.

Referring more particularly to the said drawing, in which like reference characters refer to like parts throughout the several views, my new device or applicator comprises a frame-work composed of a suitable base-plank 3, spaced upright tubular standards 4, each standard 4 having a longitudinally disposed slot 5, and an adjustable stay-rod 6. This frame-work may form part of a fence or other inclosure, as will be obvious, and on occasion the plank 3 may be omitted, the standards 4 being mounted directly in the ground, concrete-bases, or the like.

Resting in each standard 4, as seen in Fig. 1, is an extensile coil spring 7, which acts to yieldingly support a runner 8 in each standard. Pivotally connected to each runner 8, and movably extending through its standard-slot 5 is an inwardly presented arm 9 provided with lateral branches 19. Fixed to, and extending between, the arms 9 is a tank 10 adapted to contain the liquid or medicament, usually crude oil, to be applied to the live-stock for well understood purposes.

Preferably there is provided for the upper end of each standard 4, a threaded cap 11, each cap having a lateral socket 12 for the reception of one end of the stay-rod 6, which is rigidly held removably by set-screws or the like 13 carried by the sockets 12. In order to provide for convenient placement or removal of the rod 6, the rod length is less than the spacing of the standards, and the one socket is of such depth or length as to receive the one rod-end while the opposite rod-end is inserted in the other socket, after which the rod is bodily moved to a position where it is engageable by both screws 13.

The runners 8 are preferably of tubular formation and are each provided with a slot through which the arms 9 of the tank 10 extend and connect with the runners by pivot-pins 14, so that the tank may freely move vertically regardless of its inclination and whereby also the tank 10 may obliquely yield to accommodate and apply its contained liquid to two animals of different height passing therebeneath at the same time. Contributive to this freedom of vertical movement of the tank 10, the runner-walls are preferably sectionally convexed, as shown at 15, Fig. 1, whereby the runners may more easily pass irregularities on the inner surfaces of the standards 4.

The tank 10 is preferably of substantially cylindrical shape and provided in its bottom with a longitudinal slot having throughout its length downwardly extended or depending flanges or lips 16, which are preferably sectionally undulated or corrugated and which are arranged to receive therebetween a suitable strip of felt or other absorptive material 17 having inherent capillarity. For securing the strip of material 17 between the flanges or lips 16, I preferably employ bolts and winged nuts 18, which, in addition to their function as holding or clamping means for the strip or material 17, serve also as means for controlling the liquid or medicament flow by capillarity by regulating the pressure of the flanges or lips on the strip or material 17.

Disposed parallel with the tank 10 and arranged on each side thereof, as seen more particularly in Fig. 2, are rollers 21—21 having their journals 20 mounted for rotatory movement in the branches 19 of the arms 9. As shown, the rollers 21 are located slightly below the plane of the lowermost margins of the flanges or lips 16, the rollers 21 constituting means for assisting the animal in elevating the tank 10 as may be necessary and also for supporting the tank with a minimum of resistance upon the animal's head and back as it passes therebeneath. The rollers 21 further prevent any possible likelihood of injury to the animal by engagement by the animal with the tank 10 or the more or less sharp edges of its flanges or lips 16.

The arms 9 also carry branches 22 leading upwardly and laterally to serve as supports for barriers 23, which serve to prevent the animal or animals jumping over, instead of passing beneath, the tank 10 and its strip or brush 17.

In the use of my new device, the liquid or medicament is applied directly without waste upon the back of the animal as it passes beneath and engages the strip or brush 17, the liquid flowing from the animal's back down its sides; and a distinct advantage arising from the employment of the strip or mass of capillary material is that it is ready to serve or function at all times without operating parts, such as valves or other flow-controlling means, and this without waste of the liquid, as the flow from such material occurs only at a time when an animal is engaging and removing the liquid or medicament by contact therewith. As is common, the tank 10 is provided with a suitable filling opening for supplying the liquid or medicament thereinto.

A further distinct advantage arises from the employment of the spring-supports 7 for the tank 10 and its brush 17, these supports not only assisting the animal to elevate the device over its head and back and yet in no wise interfering with the gravity holding of the applicator proper to the animal's back in passing therebeneath, but also serving to vibrate the tank after the same leaves a hog's or other animal's back and falls by gravity thereupon, the solution in the tank being thereby agitated or shaken and flow thereof into the brush 17 accelerated.

I am aware that changes in the form, construction, arrangement, and combination of the several parts of my new applicator may be made and substituted for those herein shown and described without departing from the nature and principle of my invention.

Having thus described my invention, what I claim and desire to secure by Letters Patent is:

1. An applicator for live-stock comprising a pair of spaced vertical standards, medicament-applying means including a tank disposed crosswise between and having connection with the standards, said means being bodily freely movable lengthwise of the standards by an animal passing therebeneath, and rollers carried by said means, said rollers being disposed slightly below, and longitudinally upon opposite sides of, the tank and being adapted for engagement by the animal in passing beneath or in elevating said means.

2. An applicator for live-stock comprising a pair of spaced vertical standards, a tank adapted to contain liquid disposed crosswise between and having connection with the standards, a brush-outlet for the tank, the tank and its brush being bodily freely movable lengthwise of the standards by an animal passing therebeneath, and rollers carried by the tank, said rollers being disposed below the lower margin, and longitudinally upon opposite sides, of the tank and being adapted for engagement by the animal in passing beneath or in bodily elevating the tank and its brush.

3. An applicator for live-stock comprising a pair of spaced vertical standards, runners having engagement with, and freely movable upon and lengthwise of the standards, and medicament-applying means including a tank disposed crosswise between, and freely movable with the runners in either a horizontally or obliquely disposed position relatively to, the standards, the tank having pivoted engagement at its ends with the runners.

4. An applicator for live-stock comprising a pair of spaced vertical standards, the standards being provided with longitudinal slots, runners disposed within and movable relatively to the standards, medicament-applying means including a tank disposed between the standards, and arms on the tank projecting through said slots and pivotally connected to the runners.

5. An applicator for live-stock comprising a pair of spaced vertical standards, the standards being provided with longitudinal slots, runners disposed within and movable relatively to the standards, medicament-applying means including a tank disposed between the standards, arms on the tank projecting through said slots and pivotally connected to the runners, and coiled springs within the standards providing normally resilient supports for the runners and their connected tank.

6. An applicator for live-stock comprising a pair of spaced vertical standards, runners having engagement with, and freely movable upon and lengthwise of the standards, and medicament-applying means including a tank disposed crosswise between the standards and having engagement at its ends with the runners, the tank having such engagement with the runners that the same may bodily freely assume, on an animal passing therebeneath, a position obliquely disposed to the standards.

7. An applicator for live-stock comprising a pair of spaced vertical standards, runners having engagement with, and freely movable upon and lengthwise of the standards, and medicament-applying means including a tank disposed crosswise between the standards, the tank having pivoted engagement at its ends with the runners, whereby the tank may bodily freely assume, on an animal passing therebeneath, a position obliquely disposed to the standards.

8. In an applicator for live-stock the combination with medicament-applying means including a tank, of a support therefor comprising a pair of spaced vertical standards, runners mounted upon and movable on the standards, said runners having engagement with the tank, and elastic members serving normally as resilient rests for the runners and their connected tank.

In testimony whereof, I have signed my name to this specification.

GEORGE D. MAY.

Copies of this patent may be obtained for five cents each, by addressing the "Commissioner of Patents, Washington, D. C."